United States Patent
Jungbauer

[11] Patent Number: 6,047,993
[45] Date of Patent: Apr. 11, 2000

[54] ARRANGEMENT FOR CONNECTION PIPE PIECES AND METHOD OF MAKING SAME

[75] Inventor: Leopold Jungbauer, Baltmannsweiler, Germany

[73] Assignee: DaimlerChrysler AG, Germany

[21] Appl. No.: 09/032,079

[22] Filed: Feb. 27, 1998

[30] Foreign Application Priority Data

Feb. 27, 1997 [DE] Germany ............... 197 07 813

[51] Int. Cl.[7] .................................................. F16L 55/00
[52] U.S. Cl. ...................... 285/49; 285/318; 285/300; 285/299; 285/226
[58] Field of Search ............... 285/49, 318, 300, 285/299, 226

[56] References Cited

U.S. PATENT DOCUMENTS

| | | | |
|---|---|---|---|
| 2,616,728 | 11/1952 | Pitt | 285/300 X |
| 4,243,253 | 1/1981 | Rogers, Jr. | 285/226 X |
| 5,403,044 | 4/1995 | Höll. | |
| 5,437,479 | 8/1995 | Hartling et al. | |
| 5,842,723 | 12/1998 | Hartling et al. | 285/49 |

FOREIGN PATENT DOCUMENTS

| | | |
|---|---|---|
| 4233644A1 | 4/1994 | Germany. |
| 4328858C2 | 3/1995 | Germany. |

Primary Examiner—Lynne H. Browne
Assistant Examiner—David Bochna
Attorney, Agent, or Firm—Evenson, McKeown, Edwards & Lenahan, P.L.L.C.

[57] ABSTRACT

An arrangement for connecting pipe pieces, particularly pipe pieces of exhaust systems of motor vehicles, is provided with end sleeves each fastened to the ends of the pipe pieces and pointing in each case to the other pipe end. In the interior of the end sleeves, bellows are arranged, the ends of the bellows being in each case connected with a pipe piece. A stranded spring extends helically along the outer circumference walls of the end sleeve. On the exterior side, the stranded spring is at least partially covered by protection sleeves which are provided with corrugations adapted to the course of the helical line and in whose interior the stranded spring is guided. The protection sleeve is connected with the end sleeves and the ends of the stranded spring are connected with the protection sleeves or the end sleeves.

26 Claims, 1 Drawing Sheet

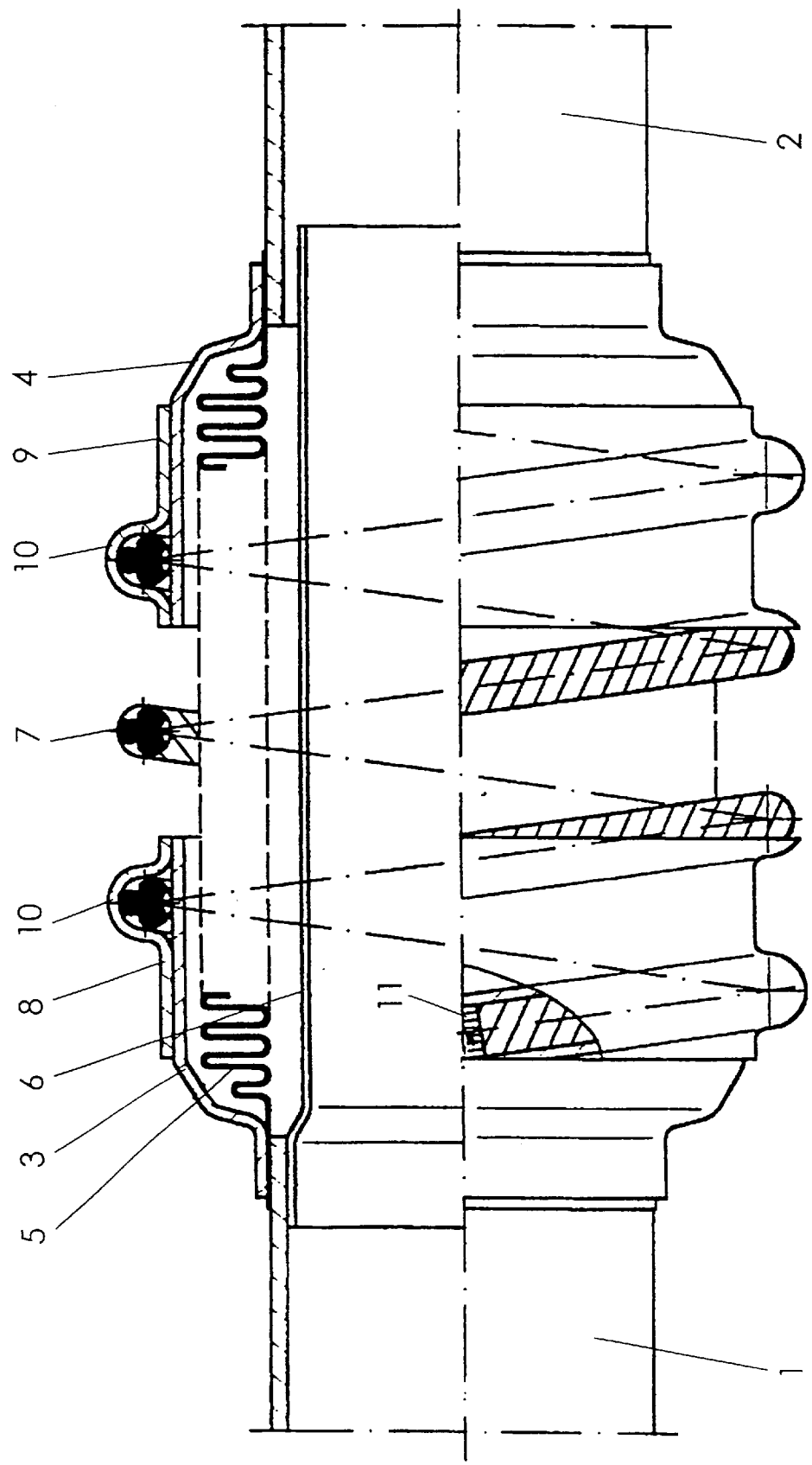

ARRANGEMENT FOR CONNECTION PIPE PIECES AND METHOD OF MAKING SAME

BACKGROUND AND SUMMARY OF THE INVENTION

This application claims the priority of German application 197 07 813.3-12 filed in Germany on Feb. 27, 1997, the disclosure of which is expressly incorporated by reference herein.

The invention relates to an arrangement for connecting pipe pieces, particularly pipe pieces in exhaust systems of motor vehicles having end sleeves which are in each case fastened to the ends of the pipe pieces and point in each case to the other pipe end, in the interior of the end sleeves bellows being arranged and the ends of the bellows being in each case connected with a pipe piece, and with a spring which extends at least partially along the outer circumferential walls of the end sleeves and connects two pipe pieces with one another.

An arrangement of this type, by means of which a flexible connection between pipe pieces is achieved, is known from German Patent Document DE 42 33 644 A1. In this case, the connection of the two pipe pieces takes place by a coil spring placed on the exterior side over the end sleeve. In this manner, the two pipe pieces are connected with one another in a resilient and articulated manner, whereby they are uncoupled with respect to vibrations. This means that relative movements, oscillations and vibrations between the pipe pieces are uncoupled. For damping the vibrations, a damping insert is provided which radially encloses bellows, which provide gas tightness for the pipe pieces. Above the damping insert, the coil spring is arranged which transmits the forces occurring in the axial longitudinal direction and simultaneously exercises a prestressing into an initial center position.

For fixing the position, the coil spring is welded at several points to the end sleeves.

However, in the case of this arrangement, it is a disadvantage that it has a relatively large outside diameter. Furthermore, the damping properties of the damping insert, which preferably consists of a metallic mesh, woven, texture or knit, may change in the course of the operation.

The present invention is therefore based on the object of providing an arrangement of the initially mentioned type which has good damping properties while it requires little space.

According to the invention, this object is achieved by providing an arrangement of the above noted type wherein the spring is constructed as a stranded spring which extends helically along the outer circumferential walls of the end sleeves and which is at least partially covered on an exterior side by protection sleeves which have corrugations adapted to a course of a helical line of the stranded spring, the stranded spring being guided in the corrugations, and wherein the protection sleeves are connected with the end sleeves and ends of the stranded spring are connected with one of the protection sleeves and the end sleeves.

It was found that a stranded spring in connection with the protection sleeves for its guiding and positioning is particularly suitable for a flexible connection of pipe pieces of the initially mentioned type. Because of the further development of stranded springs, these have very good damping properties so that a separate damping device is not required. This means that not only a low-cost construction can be achieved but also an arrangement which requires less space. However, for the operability of the stranded spring, it had to be provided that it cannot "turn out" during the operation. This is achieved by its positioning and guiding in the corrugations. Inside the corrugations, the stranded spring wire can absorb torsional movements, in which case, by means of the friction of the individual spring wires or strands among one another and in the corrugations of the protection sleeve, a very good damping effect is achieved, so that further damping measures are not required.

Another advantage of the use of a stranded spring according to the invention is the fact that it has a longer service life than coil springs. Furthermore, an additional protective effect, which also has a positive effect on the durability of the arrangement, is achieved by means of the protection sleeves surrounding the stranded spring on the exterior side.

In the following, an arrangement is described for connecting pipe pieces in an exhaust system of a motor vehicle. However, this connecting arrangement is basically also suitable for other uses in which an uncoupling of pipe pieces is also important.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a part sectional view of an arrangement connecting two pipe pieces, constructed according to a preferred embodiment of the invention.

DETAILED DESCRIPTION OF THE DRAWINGS

Two pipe pieces 1 and 2 are provided with one end sleeve 3 and 4 respectively on their mutually facing ends. On their ends facing away from one another, the two end sleeves 3 and 4 may each be connected with the pertaining pipe piece 1 or 2 by means of welding. From this end area, the diameters of both end sleeves 3 and 4 are enlarged. In the clearance created thereby, bellows 5 are arranged which are also connected on their two ends with the pipe pieces 1 and 2 by means of welding. By means of the bellows 5, a gas tightness of the pipe system is achieved. The bellows 5 may be constructed as metal bellows with a single or with several sheet metal layers.

For a protection against heat, a heat protection sleeve 6 which extends in the longitudinal direction may also be provided on the interior side. While the heat protection sleeve is fixedly arranged on the pipe piece 1, for example, by means of welding, it projects with play into the pipe piece 2, whereby the parts of the arrangement situated on the exterior side of the heat protection sleeve 6 are correspondingly protected.

A stranded spring 7 is wound on the exterior side helically over the two end sleeves 3 and 4, in which case it also covers the space between the two interior ends of the end sleeves 3 and 4 which are spaced with respect to one another. On its two ends, the stranded spring is fastened on the end sleeve 3 and 4 by way of a weld seam 11. By means of the stranded spring 7, the two pipe pieces 1 and 2 are therefore connected with one another. The stranded spring 7 consists of three individual wires or strands which are twisted together. The invention also contemplates use of stranded springs with more than three strands which are twisted together.

On the exterior side, the stranded spring 7 is provided at least in the area of its two ends with one protection sleeve 8 and 9 respectively. The two protection sleeves 8 and 9 have an undulated construction with waves pointing to (bulging toward) the outside, whereby corrugations 10 are created. The corrugations 10 extend helically over the circumference of the end sleeve 3 and 4.

As illustrated in the drawing, the stranded spring 7 is guided in the corrugations 10 and is therefore also fixed in its position. This means that there is no danger that the stranded spring 7 will turn out because of the occurring vibrations. On the contrary, it is form-lockingly fixed in this manner and is simultaneously protected.

Because of this development, the stranded spring fulfills two purposes; specifically, on the one hand, it is used for connecting the two pipe pieces 1 and 2 with one another, and, on the other hand, it acts in a vibration-damping manner because of the friction of the individual strands with respect to one another and in the corrugations 10. Instead of welding the two ends of the stranded spring 7 to the two end sleeves 3 and 4, the two ends of the stranded spring 7 may also be welded to the two protection sleeves according to other contemplated embodiments of the invention. Since the two protection sleeves 8 and 9, in turn, are each welded to the pertaining end sleeve 3 and 4, the required connection can also be established in this manner.

The two protection sleeves 8 and 9 may extend in the axial direction along a larger area. However, generally it should be sufficient for fixing the position if in each case it has such an axial length that the pertaining corrugation 10 extends once or twice along a whole circumferential area.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for connecting two pipe pieces, particularly pipe pieces in exhaust systems of motor vehicles, comprising:

end sleeves which are each fastened to an end of a pipe piece and oppose each other, bellows arranged in the interior of the end sleeves, wherein each bellow is connected with a pipe piece, and a spring which extends at least partially along outer circumferential walls of the end sleeves and connects the two pipe pieces with one another, wherein the spring is constructed as a stranded spring which extends helically along the outer circumferential walls of the end sleeves and which is at least partially covered on an exterior side by protection sleeves which have corrugations adapted to a course of a helical line of the stranded spring, the stranded spring being guided in the corrugations, and wherein the protection sleeves are connected with the end sleeves and ends of the stranded spring are connected with one of the protection sleeves and the end sleeves.

2. Arrangement according to claim 1, wherein the corrugations are formed by an undulated construction of the protection sleeves.

3. Arrangement according to claim 1, wherein the stranded spring has three or more individual strands which are twisted with one another.

4. Arrangement according to claim 2, wherein the stranded spring has three or more individual strands which are twisted with one another.

5. Arrangement according to claim 1, wherein the end sleeves are welded to the pipe pieces and the protection sleeves are welded to the end sleeves.

6. Arrangement according to claim 2, wherein the end sleeves are welded to the pipe pieces and the protection sleeves are welded to the end sleeves.

7. Arrangement according to claim 3, wherein the end sleeves are welded to the pipe pieces and the protection sleeves are welded to the end sleeves.

8. Arrangement according to claim 4, wherein the end sleeves are welded to the pipe pieces and the protection sleeves are welded to the end sleeves.

9. Arrangement according to claim 1, wherein respective ends of the stranded spring are welded to the respective protection sleeves.

10. Arrangement according to claim 1, wherein respective ends of the stranded spring are welded to the respective end sleeves.

11. Arrangement according to claim 1, wherein a heat protection sleeve is fixed at one end to one of said pipe pieces and at an opposite end extends with play into the other of said pipe pieces, said heat protection sleeve extending radially inside said bellows.

12. A pipe connection assembly comprising:

first and second facing pipe ends aligned with and spaced from one another by a spacing gap, a first end sleeve circumferentially surrounding and connected to said first pipe end, said first end sleeve extending beyond said first pipe end over a portion of said spacing gap, a second end sleeve circumferentially surrounding and connected to said second pipe end, said second end sleeve extending beyond said second pipe end over a portion of said spacing gap, said first and second end sleeves being aligned with and being axially spaced from each other, a helical corrugation carried by at least one of said end sleeves, and a stranded spring supported in said helical corrugation and connecting said pipe ends together in a vibration damping manner by way of friction between individual strands of the stranded spring.

13. A pipe connection assembly according to claim 2, wherein both of said end sleeves are provided with helical corrugations supporting respective ends of said stranded spring.

14. A pipe connection assembly according to claim 13, wherein each of said helical corrugations extend circumferentially around a central axis through said pipe ends by at least one revolution.

15. A pipe connection assembly according to claim 14, wherein said end sleeves are welded to respective ones of said pipe ends and have end sleeve diameters greater than respective diameters of said pipe ends.

16. A pipe connection assembly according to claim 15, comprising sealing bellows connecting said pipe ends and disposed radially inside said end sleeves.

17. A pipe connection assembly according to claim 16, wherein a heat protection sleeve is fixed at one end to one of said pipe pieces and at an opposite end extends with play into the other of said pipe pieces, said heat protection sleeve extending radially inside said bellows.

18. A pipe connection assembly according to claim 12, wherein said pipe ends are components of a motor vehicle exhaust pipe system.

19. A pipe connection assembly according to claim 16, wherein said pipe ends are components of a motor vehicle exhaust pipe system.

20. A pipe connection assembly according to claim 17, wherein said pipe ends are components of a motor vehicle exhaust pipe system.

21. A pipe connection assembly according to claim 13, wherein said helical corrugations are provided in respective protection sleeves welded to said end sleeves.

22. A method of making a pipe connection assembly for connecting first and second axially aligned and spaced pipe ends, said method comprising:

welding a first end sleeve to the first pipe end, welding a second end sleeve to the second pipe end, connecting a stranded helical spring to said pipe ends, and welding a protection sleeve having a corrugation which fits over and frictionally engages at least part of a helical winding of said stranded helical spring.

23. A method according to claim 22, wherein the protection sleeve comprises two protection sleeves, each protection sleeve having corrugations which fit over and frictionally engage at least part of the helical winding of said helical spring.

24. A method according to claim 23, comprising connecting a bellows between said pipe ends radially inside said end sleeves.

25. A method according to claim 22, comprising welding a heat protection sleeve at one end to one of said pipe ends with said protection sleeve protruding with play into the other of said pipe ends.

26. A method according to claim 24, comprising welding a heat protection sleeve at one end to one of said pipe ends with said protection sleeve protruding with play into the other of said pipe ends.

* * * * *